Figure 1:
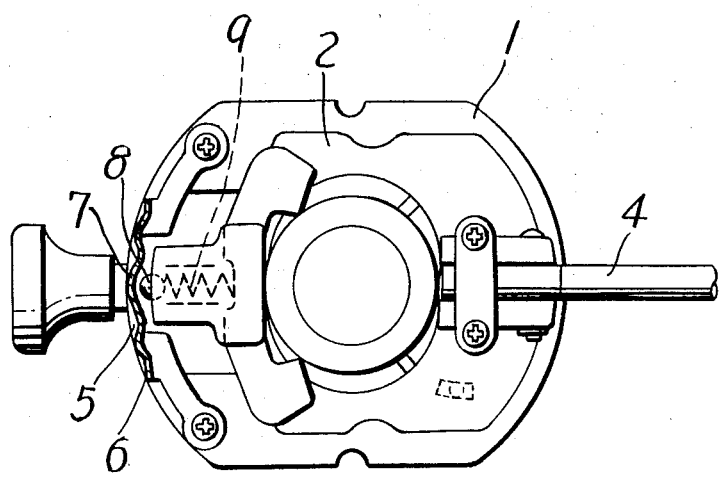

United States Patent
Suzuki et al.

[15] 3,699,286
[45] Oct. 17, 1972

[54] DIRECTIONAL SIGNALING MECHANISM FOR AUTOMOTIVE VEHICLE

[72] Inventors: Masaru Suzuki, Chiryu; Yoshihiro Kawai, Nagoya, both of Japan

[73] Assignee: Kabushiki-Kaisha Tokai Rika Denki Seisakusho, Aichi-ken, Japan

[22] Filed: April 6, 1971

[21] Appl. No.: 131,659

[30] Foreign Application Priority Data

April 10, 1970 Japan ......................45/35069

[52] U.S. Cl. .............................................200/61.34
[51] Int. Cl. .............................................H01h 3/18
[58] Field of Search.............200/61.34, 61.27, 61.54

[56] References Cited

UNITED STATES PATENTS 3,459,909  8/1969  Winogrocki et al. ...200/61.34
3,180,177  4/1965  Ford et al. ..........200/61.34 X
3,594,724  7/1971  Evers..................200/61.54 X
R26,648    8/1969  Stoi et al.................200/61.34

*Primary Examiner*—H. O. Jones
*Attorney*—Shlesinger, Fitzsimmons & Shlesinger

[57] ABSTRACT

A direction signalling apparatus for a vehicle has an actuating member which is movable manually from a neutral position to one of two operating positions for indicating selectively a left-hand or a right-hand turn, or to intermediate positions between the operative positions for signaling a change of lanes. The actuating member will be returned automatically to its neutral position from either of its intermediate positions upon release of the actuating member, but it will be returned from either of its two operating positions only upon backward rotation of the steering wheel.

2 Claims, 3 Drawing Figures

INVENTORS
Masaru Suzuki and Yoshihiro Kawai

DIRECTIONAL SIGNALING MECHANISM FOR AUTOMOTIVE VEHICLE

This invention related to a direction signaling apparatus for a vehicle, and more particularly to a direction signaling apparatus, which may be actuated from a neutral position to either one of two operating positions so as to indicate either a left-hand or a right-hand turn, which will require rotation of a steering wheel through an angular distance sufficiently great to restore an actuated direction signal to the neutral position, which may also be actuated from neutral position to an intermediate position adjacent to either one of the operating positions to indicate a change of lanes, and which will not require rotation of the steering wheel through said aforementioned angular distance to restore an actuated direction signal to the neutral position.

In conventional direction signaling apparatuses, it is required for indicating a change of lanes of a vehicle running, for example, on a highway to operate a manually operable actuator from a neutral position to either one of two operating positions at which either a left-hand or a right-hand turn is indicated and from which the actuator may be restored to the neutral position only upon rotation of the vehicle's steering wheel through a predetermined angular distance. In case of a change of lanes, however, the actuator which has been actuated to either one of two operating positions may not be restored automatically to its neutral position but has to be manually restored to the neutral position, because such change of lanes ordinarily will not require rotation of the vehicle's steering wheel through an angular distance sufficiently great to restore the actuator to its neutral position. Should a driver operate the actuator to either one of its two operating positions merely to indicate a change of lanes and fail to manually restore the actuated actuator to the neutral position after making a lane change, the operation of a vehicle's direction signals will continue, resulting in traffic confusion.

In order to eliminate such disadvantages of conventional direction signaling apparatus, the present invention provides a direction signaling apparatus of the kind, in which an actuating member mounted on a support member is movable from a neutral position to either one of two operating positions so as to indicate either a left-hand or a right-hand turn, said actuating member is releaseably detained at either one of said two operating positions by means of detent means which comprises three V-shaped notches spaced from each other predetermined angular distances by a pair of outwardly projecting nodes and provided on one of the aforementioned actuating and supporting on the other member and members, and a detent device biased by spring means so as to releasably engage one of the three notches upon the movement of the actuating member to an operative position. The movement of the actuating member from the neutral position to either one of the two operating positions is arrested at an intermediate position where the detent device is just going to pass over either one of the two nodes by means of sensing means which acts, between the actuating member and supporting member at a position other than the place where the detent means is provided, to resist further movement of the actuating member beyond the aforementioned position intermediate. This resistance is sufficient to let a driver know that the actuating member is at a position at which electrical contacts of the apparatus are operable to indicate a lane change, and from which the actuating member may be automatically returned to its neutral position upon the release of said member by the driver.

Figure 2:
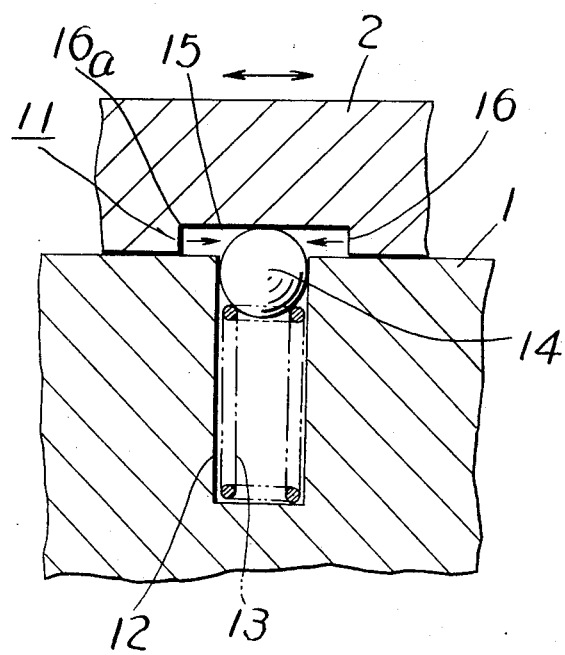
Figure 3:
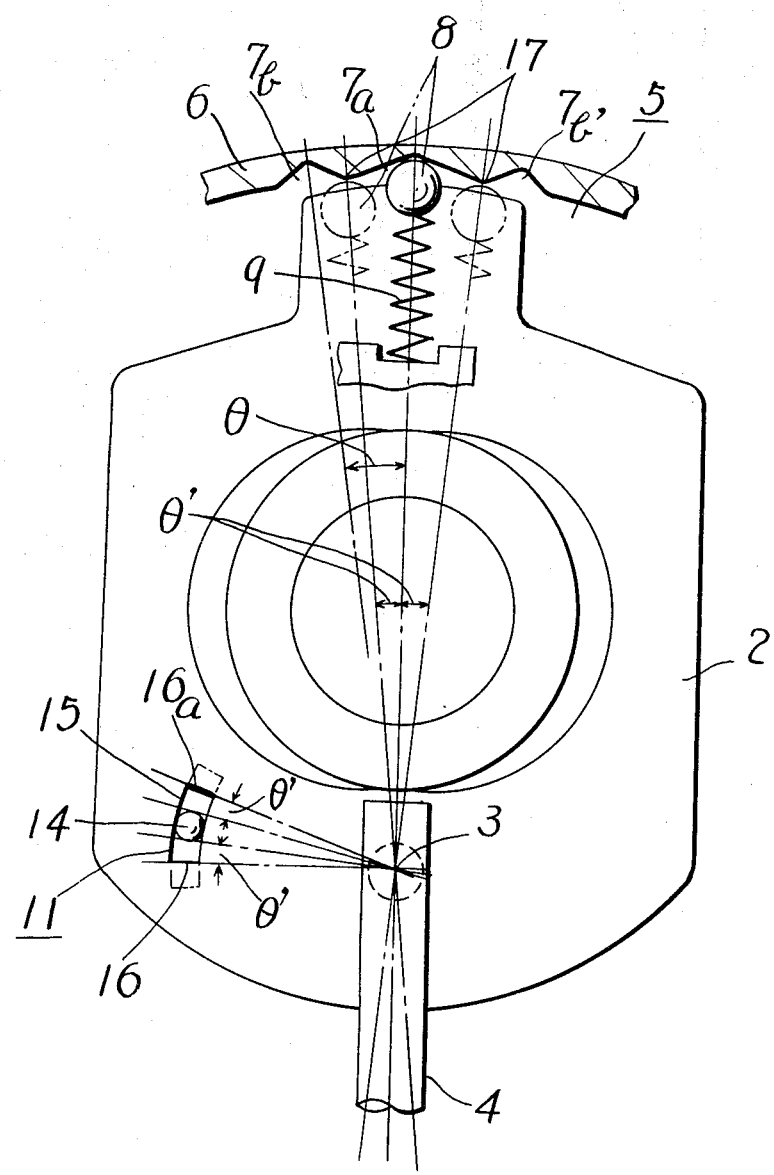

In the accompanying drawing which illustrates a preferred embodiment of the present invention direction signaling apparatus for a vehicle;

FIG. 1 is a plan view of the present invention apparatus, which is partly cut open, FIG. 2 is an enlarged sectional view of principal parts of the apparatus including the sensing means thereof, and FIG. 3 is an explanatory plan view of the apparatus.

Now, referring to the drawing, mounted on a supporting member 1 for pivotal movement about and axis 3 is an actuating member 2 which is normally biased to a neutral position, and settable from the neutral position to either one of two operating positions so as to indicate either a left-hand or a right-hand turn by manipulating an operating lever 4 through a predetermined angular distance. Numeral 5 indicates detent means provided on the supporting member 1 for detaining the actuating member 2 at the neutral position or either one of the two operating positions. It comprises a plurality of notches 7 spaced from each other predetermined angular distances by a plurality of nodes 6, and a detent device 8 such as a steel ball which is movably mounted on the actuating member 2 and biased by a spring means 9 towards the detent means 5 so as to be releaseably engageable with one of the notches 7.

Numeral 11 indicates sensing means which constitutes a principal part of the present apparatus. It is provided between the actuating and supporting members 1 and 2 so as to be coactive between said two members at a position other than the place where the detent means 5 is provided. More concretely, said sensing means 11 comprises, as illustrated in FIG. 2, a comparatively deep blind hole 12 provided in the upper surface of supporting member 1, a detent ball 14 accomodated within said hole 12 so as to be partially projected by force of a coil spring 13 from the upper surface of the supporting member, and a groove 15 provided in the underside of the actuating member 2. The detent ball 14 registers with the middle longitudinally of the groove 15 when the actuating member 2 is at its neutral position. The distance between the point of contact of ball 14 with the groove 15, when the actuating member 2 is at its neutral position, and an end wall 16 or 16' of groove 15 is selected so as to correspond with the distance by which the detent device 8 must be swung from its neutral position to a position 17 where it registers with one of the nodes 6 which separate the central notch 7 from the other notches. Instead of the above construction, the detent ball 14 may be provided on the actuating member, and the groove 15 in the supporting member 1.

The function of the apparatus having the above construction is explained hereinunder, with reference to FIG. 3. A left-hand or a right-hand turn is indicated by turning the actuating member 2 from its neutral position in which it is engaged with the web 7a, by means of the operating lever 4 through an annular distance in the left or right direction respectively, where the detent, device 8 of detent means 5 engages either the notch 7b or 7b' respectively. With this movement of the actuating member 2, the groove 15 therein turns through an angular distance equal to the distance given to the actuating member, and one of its end walls 16 or 16a engages the detent ball 14 at the position 17 of nodes 6, thereby producing further resistance against the turning movement of the actuating member. Said engagement between the end wall 16 or 16a and the detent ball is, however, released when the actuating member is further rotated towards either one of the operating positions because the detent ball 14 is depressed, by the contact of said end wall with the ball, inwardly towards the bottom of the blind hole 12 against the resistance exerted by spring 13 upon the ball.

When a driver wishes to actuate turning signals temporarily for indicating a change of lanes, the actuating member 2 has to be held by the driver at one of the intermediate positions or locations where additional resistance is given to the turning operation of the actuating member on account of the abutment of either one of end walls 16 or 16a of the groove 15 with the detent ball 14. The location where the abutment of either one of end walls 16 or 16a of groove 15 with the detent ball 14 takes place corresponds to the moment when the detent device 8 has moved from the web 7a and reached almost the top 17 of either one of modes 6 after having been turned through an angular distance $\theta'$ which is about a half of the aforementioned angular distance $\theta$. The value of angular movement of the groove 15 in this instance is also $\theta'$. Upon release of the actuating member by the vehicle's driver at said location, the detent device 8 slides back along a side of the V-shaped notch 7a towards the bottom thereof by spring 9 which works on the actuating member through ball 8 and the inclined surfaces of web 7a so as to bias said member to its neutral position thereby effecting the cancellation of turning signals for a change of lanes.

The present novel apparatus having the above structures can positively eliminate the disadvantages of conventional apparatus of the kind mentioned in the foregoing. It should be also noted as one of the advantages achieved by the present invention that the present apparatus can easily be converted to the type not provided with a specific mechanism for the indication of a lane change by removing therefrom the detent ball 14 and coil spring 13.

What is claimed is:

1. A direction signaling apparatus for a vehicle comprising
    a support member,
    an actuating member rotatably mounted on said support member and settable manually from a neutral position to one of two operating positions where either a left-hand or a right-hand turning signal is activated,
    resiliently-actuated means acting between confronting surfaces of said two members, and
    means for releasably and resiliently holding the actuating member in its neutral and in its two operating positions,
    one of said members having angularly spaced abutments thereon,
    said resiliently actuated means being displaced angularly about the axis of rotation of the actuating member from said holding means and being mounted on the other of said members for engagement with one of said abutments to stop movement of the actuating member when the actuating member is turned to one of two locations intermediate said operating positions, and in which locations the electric circuits for the left-hand or right-hand turning signals are activated,
    said resiliently actuated means being compressible by said abutments upon exertion of added turning pressure on said actuating member to allow the actuating member to be turned beyond said intermediate locations to either one of the two operating positions,
    said holding means being operative to return said actuating member automatically from the intermediate locations to the neutral position upon the release of the actuating member by a driver of the vehicle, and
    said resiliently actuated means being removably mounted on said other member.

2. A direction signaling apparatus for a vehicle as claimed in claim 1, in which
    said resiliently actuated means comprises a spring-loaded ball mounted in a recess in said other member, said abutments comprise the end walls of a groove in said one member and said ball is biased towards the groove in said one member,
    a spring is mounted in said recess to bias said ball in a direction perpendicular to the plane of rotation of said rotatable member,
    said ball is positioned to engage one of said end walls to stop movement of the actuating member when the actuating member is turned through an angular distance by which it reaches one of said intermediate locations, and
    said holding means comprises a second spring-loaded ball mounted on one member and interposed between said members and engageable in V-shaped grooves on the other member resiliently to hold said actuating member in each of its neutral and its operating position, and
    said balls being angularly spaced from each other about the axis of rotation of said actuating member, and being operable independently of one another.

* * * * *